United States Patent
Cox et al.

(10) Patent No.: US 10,496,818 B2
(45) Date of Patent: Dec. 3, 2019

(54) SYSTEMS AND METHODS FOR SOFTWARE SECURITY SCANNING EMPLOYING A SCAN QUALITY INDEX

(71) Applicant: JPMorgan Chase Bank, N.A., New York, NY (US)

(72) Inventors: Stuart G. Cox, Scotland (GB); Steven R. Rittmeyer, Stonington, ME (US); Thomas W. Richards, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 109 days.

(21) Appl. No.: 15/361,608

(22) Filed: Nov. 28, 2016

(65) Prior Publication Data

US 2017/0154183 A1 Jun. 1, 2017

Related U.S. Application Data

(60) Provisional application No. 62/260,842, filed on Nov. 30, 2015.

(51) Int. Cl.
| | |
|---|---|
| *G06F 21/00* | (2013.01) |
| *G06F 21/56* | (2013.01) |
| *G06F 21/50* | (2013.01) |
| *G06F 21/55* | (2013.01) |

(52) U.S. Cl.
CPC ............ *G06F 21/563* (2013.01); *G06F 21/50* (2013.01); *G06F 21/552* (2013.01); *G06F 21/567* (2013.01)

(58) Field of Classification Search
CPC .......... G06F 21/50; G06F 21/51; G06F 21/56; G06F 21/561; G06F 21/562; G06F 21/563; G06F 21/564; G06F 21/565; G06F 21/566; G06F 21/567
See application file for complete search history.

(56) References Cited

U.S. PATENT DOCUMENTS

| | | | |
|---|---|---|---|
| 8,752,183 B1 * | 6/2014 | Heiderich | G06F 21/577 726/22 |
| 9,152,694 B1 * | 10/2015 | Padidar | G06F 17/30598 |
| 2006/0184898 A1 | 8/2006 | Kern | |
| 2010/0299292 A1 * | 11/2010 | Collazo | G06F 21/577 706/14 |
| 2012/0089965 A1 | 4/2012 | Batthish et al. | |
| 2012/0185945 A1 | 7/2012 | Andres et al. | |
| 2013/0262387 A1 | 10/2013 | Varadharajan et al. | |
| 2016/0171415 A1 * | 6/2016 | Yampolskiy | H04L 63/1433 705/7.28 |

OTHER PUBLICATIONS

PCT International Search Report, International Application No. PCT/US2016/063813, dated Feb. 7, 2017, pp. 1-2.

* cited by examiner

*Primary Examiner* — Edward Zee
(74) *Attorney, Agent, or Firm* — Greenberg Traurig LLP

(57) ABSTRACT

In one embodiment, a method for software security scanning employing a scan quality index may include (1) a server comprising at least one computer processor receiving an identification of a computer program for security scanning; (2) the server executing a security scan on the computer program resulting in at least one log file comprising results of the security scan; (3) the server executing a scan quality index tool that analyzes the at least one log file resulting in a scan quality index score; and (4) the server outputting the scan quality index score.

13 Claims, 8 Drawing Sheets

```
Calculating Scan Quality : Starts at 1.00, then...

MINUS 0.00     1 instances of "Using HP default jars"

MINUS 0.20     2855 instances of "Unable to locate metadata for function"

MINUS 0.01     5 instances of "Other"

MINUS 0.01     1328 instances of "Unresolved variable"

MINUS 0.20     69448 instances of "Unable to resolve function"

MINUS 0.30     3 instances of "Memory Issue"

SCAN QUALITY = 0.28 (1.00 - 0.72)
```

```
known_warnings":{
      "Unable to resolve type":true,
      "Unable to resolve function":{
            "weighting":{
                  "1":0.2
            }
      },
      "The following references to java functions could not be
resolved":false,
      "Unable to resolve field":true,
      "Unable to locate import":true,
      "Unable to resolve symbol":true,
      "Multiple definitions found for function":true,
      "Multiple definitions found for class":true,
      "The following references to java classes could not be resolved":{
            "heading":true,
            "alias":"Unresolved reference to java class",
            "weighting":{
                  "1":0.2,
                  "10":0.3
            }
      },
      "Could not locate the root (WEB-INF)":true,
      "Exception parsing file":{
            "count_heading_only":true
      },
      "Unexpected exception while parsing file":{
            "count_heading_only":true,
            "weighting":{
                  "1":0.2
            }
      },
      "COBOL files could not be found in the specified copydirs":{
            "heading":true,
            "alias":"Missing COBOL copybooks",
            "weighting":{
                  "100":0.2
            }
      },
      "The Java frontend was unable to resolve the following includes":{
            "heading":true,
            "alias":"Unresolved includes (JSP)"
      },
      "classpath, but it was found in the jar provided by HPE Fortify": {
            "alias": "Using HP default jars",
            "weighting": {
                  "0": 0
            }
      }
}
```

FIG. 3A

```
"known_errors":{
      "StackOverflowError":true,
      "Unexpected exception in initial analysis
phase":true,
      "exception while building call graph":{
           "count_heading_only":true
      },
      "There is not enough memory available to complete
analysis":{
           "count_heading_only":true,
           "alias":"Memory Issue"
      },
      "java.lang.OutOfMemoryError:":{
           "count_heading_only":true,
           "alias":"Memory Issue"
      },
      "insufficient memory. Results may be incomplete.":{
           "alias":"Memory Issue"
      },
      "Unexpected exception while resolving file ": {
           "alias": "Bug_54960-Unexpected exception while
resolving file ",
           "weighting": {
                "0": 0
           }
      },
      "Unexpected exception during structural analysis": {
           "alias": "Bug_57164-Unexpected exception during
structural analysis",
           "weighting": {
                "0": 0
           }
      }
}
```

FIG. 3B

```
"The following references to java classes could not be resolved":{
    "heading":true,
    "alias":"unresolved reference to java class",
    "weighting":{
        "1":0.2,
        "10":0.3
    }
}
```

FIG. 4

| Category | Name | Value |
|---|---|---|
| error | TOTAL ERRORS | 0 |
| warning | Exception parsing file | 10 |
| warning | recovered from parse error | 38 |
| warning | Unable to locate metadata for function | 4 |
| warning | Unable to resolve function | 8 |
| warning | Unresolved reference to java class | 5 |
| warning | TOTAL WARNINGS | 65 |
| info | Executable LOC (Lines Of Code) | 13900 |
| info | Scan Quality | 0.95 |
| info | Total LOC (Lines Of Code) | 43676 |

FIG. 5

```
--------------------------------------------------------------------------------
Calculating Scan Quality : Starts at 1.00, then...

MINUS 0.00       1 instances of "Using HP default jars"
    weighting of 0.0 because count of 1 is greater than 0.0
    (343921execLOC / Infinity)

MINUS 0.20       2855 instances of "Unable to locate metadata for function"
    increased weighting of 0.2 because count of 2855 is greater than 343.921
    (343921execLOC / 1000.0)

MINUS 0.01       5 instances of "Other"
    default weighting of 0.01

MINUS 0.01       1328 instances of "Unresolved variable"
    default weighting of 0.01

MINUS 0.20       69448 instances of "Unable to resolve function"
    increased weighting of 0.2 because count of 69448 is greater than 343.921
    (343921execLOC / 1000.0)

MINUS 0.30       3 instances of "Memory Issue"
    default weighting of 0.3

SCAN QUALITY = 0.28 (1.00 - 0.72)
--------------------------------------------------------------------------------
```

FIG. 6

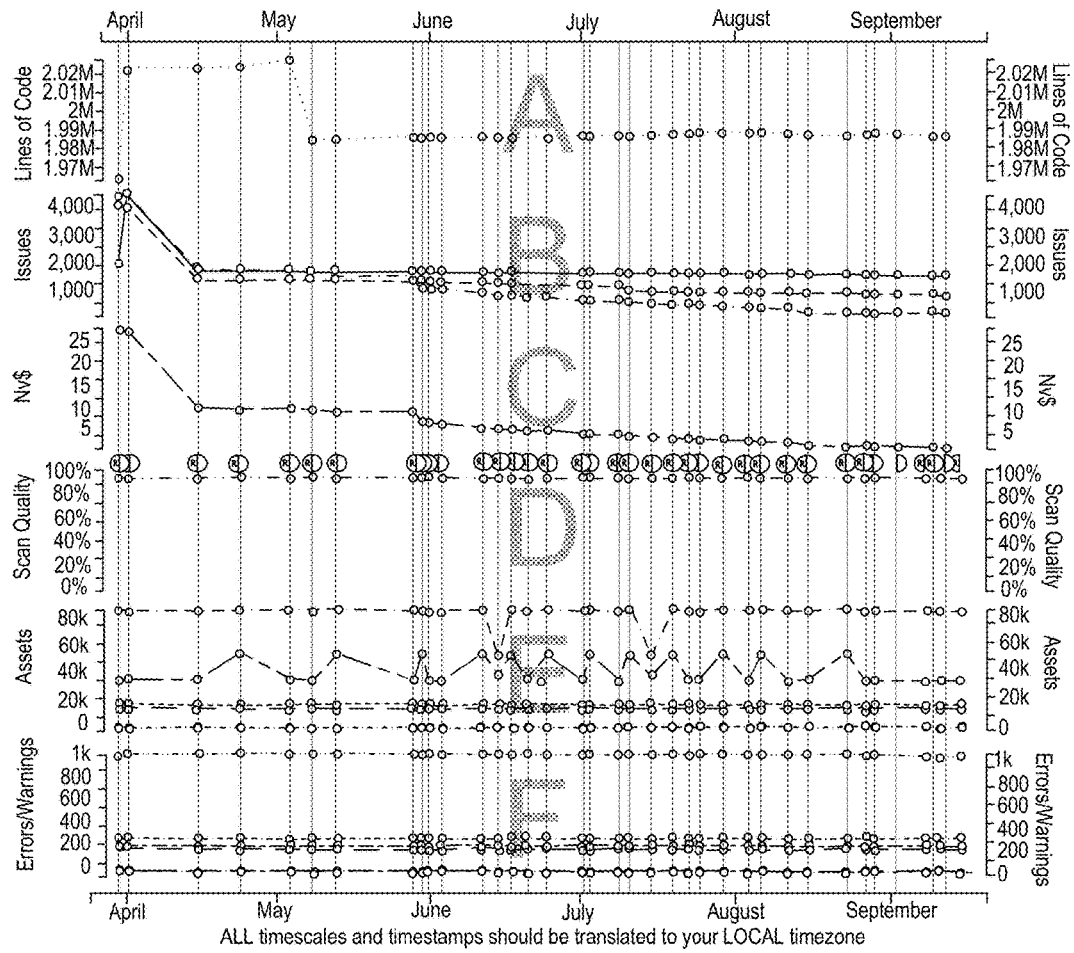

KEY: Errors/Warnings
- ─o─ Classpath load exception ☑
- ─o─ Exception parsing file ☑
- ─o─ FileNotFoundException ☑
- ─o─ Multiple definitions found for class ☑
- ─o─ Other ☑
- ─o─ Parse error in file ☑
- ─o─ Recovered from parse error ☑
- ─o─ Skipping unknown character ☑
- ─o─ Unable to locate metadata for function ☑

KEY: Assets
- ─o─ Archives Unpacked ☑
- ─o─ CLASS ☑
- ─o─ DLL ☑
- ─o─ DUPLICATES REMOVED ☑
- ─o─ HTML ☑
- ─o─ JAR ☑
- ─o─ Java ☑
- ─o─ JavaScript ☑
- ─o─ JSP (J2EE) ☑
- ─o─ MANIFEST ☑
- ─o─ NO EXTENSION ☑
- ─o─ SCA Files Scanned ☑
- ─o─ SQL ☑
- ─o─ TEXT ☑
- ─o─ UNKNOWN ☑
- ─o─ Visual Basic ☑
- ─o─ WAR ☑
- ─o─ XML ☑

A. Executable Lines of Code
   plus 'toggleable' 'Total Lines of Code'

B. Issues (aka 'Potential Vulnerabilities')
   Critical / High / Medium / Low C. 'Normalized Vulnerability Score'
   score representing overall security of the app D. Scan Quality
   'confidence' rating for the scan E. Asset Counts
   e.g. 1,433 JSP, 16271 Java 605 XML F. Errors/Warnings
   e.g. Missing Dependencies, OutOfMemory

FIG. 7

SYSTEMS AND METHODS FOR SOFTWARE SECURITY SCANNING EMPLOYING A SCAN QUALITY INDEX

RELATED APPLICATIONS

This application claims priority to U.S. Provisional Patent Application Ser. No. 62/260,842, filed Nov. 30, 2015, the disclosure of which is hereby incorporated by reference in its entirety.

BACKGROUND OF THE INVENTION

Field of the Invention

The present invention generally relates to systems and methods for software security scanning employing a scan quality index.

Description Of The Related Art

Organizations routinely scan software, such as computer applications, for security vulnerabilities. Commercial scanning engines may be used to perform this task; they often generate a result regardless of the input quality. For example, in situations when a developer checks in code, a scan may be automatically run.

SUMMARY OF THE INVENTION

Systems and methods for software security scanning with employing a scan quality index are disclosed. A scan quality index engine may provide a measure of confidence in the scan result produced by the scanning engine, based on its log output and configuration.

In one embodiment, a method for software security scanning employing a scan quality index may include (1) a server comprising at least one computer processor receiving an identification of a computer program for security scanning; (2) the server executing a security scan on the computer program resulting in at least one log file comprising results of the security scan; (3) the server executing a scan quality index tool that analyzes the at least one log file resulting in a scan quality index score; and (4) the server outputting the scan quality index score.

In one embodiment, the method may further comprise the server preventing release of the computer program when the scan quality index score is below a predetermined value.

In one embodiment, the identification of the computer program may be received when the computer program is checked in to a production database.

In one embodiment, the identification may further include an identification of one or more dependency associated with the computer program.

In one embodiment, the scan quality index tool may identify a number of each of a plurality of security problem types in the computer program identified in the security scan.

In one embodiment, the scan quality index tool may retrieve the plurality of security problem types from a configuration file.

In one embodiment, the scan quality index score may be based on a weighting assigned to each security problem type, and a number of each security problem type.

In one embodiment, the scan quality index score may be weighted based on a number of executable lines of code in the computer program.

In one embodiment, the method may further include saving the scan quality index score in a database.

According to another embodiment, a system for software security scanning employing a scan quality index may include a server comprising at least one computer processor executing a security scanning engine and a scan quality index tool; and a production database comprising at least one computer program. The security scanning engine receives an identification of a computer program for security scanning; executes a security scan on the computer program resulting in at least one log file comprising results of the security scan; and analyzes the at least one log file resulting in a scan quality index score.

In one embodiment, the scan quality index tool may prevent release of the computer program when the scan quality index score is below a predetermined value.

In one embodiment, the system may include a user interface in communication with the server that receives the scan quality index score.

In one embodiment, the system may further include a database comprising a configuration file identifying a plurality of security problem types.

In one embodiment, the security scanning engine may automatically scans the computer program when it is checked in to the production database.

In one embodiment, the scan quality index tool may identify a number of each of a plurality of security problem types in the computer program identified in the security scan.

In one embodiment, wherein the scan quality index tool may retrieve the plurality of security problem types from a configuration file.

In one embodiment, the scan quality index score may be based on a weighting assigned to each security problem type, and a number of each security problem type.

In one embodiment, the scan quality index score may be weighted based on a number of executable lines of code in the computer program.

BRIEF DESCRIPTION OF THE DRAWINGS

For a more complete understanding of the present invention, the objects and advantages thereof, reference is now made to the following descriptions taken in connection with the accompanying drawings in which:

FIGS. 3A and 3B depict an exemplary JSON structure for a configuration file according to one embodiment;

FIG. 4 depicts an exemplary warning definition according to one embodiment;

FIG. 5 depicts an exemplary metrics table displaying a scan quality with warnings according to one embodiment;

FIG. 6 depicts an exemplary explanation of a scan quality calculation according to one embodiment; and FIG. 7 depicts an exemplary graphical scan quality index according to one embodiment.

DETAILED DESCRIPTION OF PREFERRED EMBODIMENTS

Figure 1:
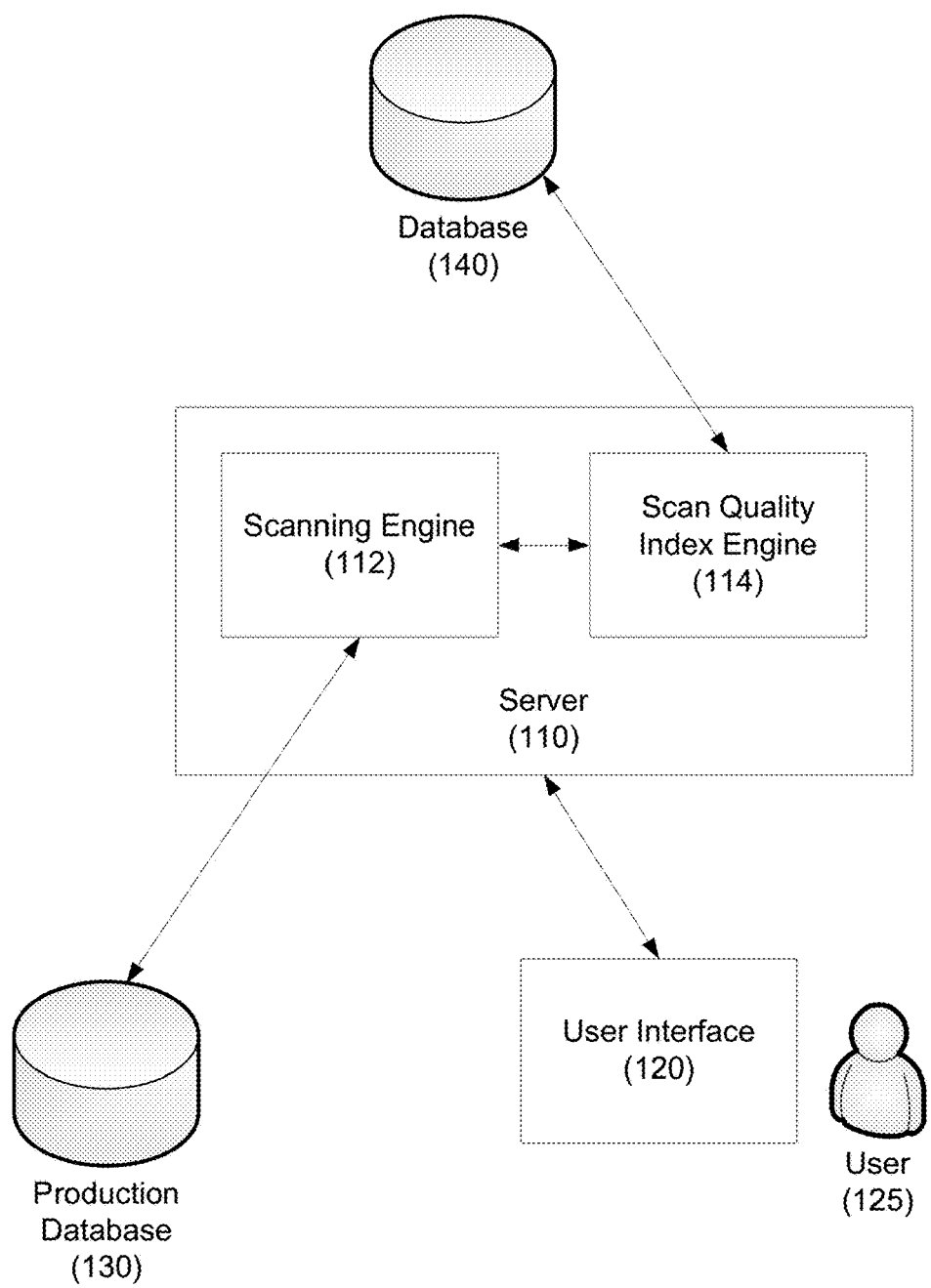
FIG. 1 depicts a system for software security scanning with employing a scan quality index according to one embodiment.

Several embodiments of the present invention and their advantages may be understood by referring to FIGS. 1-7.

Embodiments of the disclosure are directed to systems and methods for software security scanning with scan quality index.

As discussed above, scans may be triggered when a developer checks in code, and the scans may rely on input data that is provided. An example scanning engine is Fortify provided by Hewlett Packard. Fortify always generates a scan, regardless of the quality of the input. This poses a challenge in managing the quality of the scan results—for example, a scan may be working perfectly, but, for example, due to a code change failing to execute one of the security analyzers, the scan may miss vulnerabilities that the tool would otherwise be able to find.

In order to determine the problem with the scan, the verbose scan log files that are generated by the scan tool often need to be manually reviewed in order to understand any errors that the scan tool is identifying.

An example of a situation that may lead to low-quality scans is a code change made by a developer that requires a new third party library to run the code. The developer "checks in" the code change, but the scanning engine does not have access to this library. This may cause the dataflow analyzer to fail to run properly and therefore whitewash the scan result. The scanning engine may give a warning, but may still generate a scan result, albeit with less identified vulnerabilities than there actually are.

Other examples of situations that may lead to low quality scans include versions of code dependencies that increment over time, when more resources are required to complete the scan, when auto-generated code is un-scannable, when there are hard coded paths in build files, when invalid language syntax and invalid characters are in files, etc.

The low quality scan problem may be further aggravated by limitations in the scanning engine. e.g., the engine may be slightly behind the latest language definitions and may not always support all syntaxes.

According to embodiments, software security scanning employing a scan quality index are disclosed. In one embodiment, a scan quality index may be based on errors and/or warnings that may be produced by the scan tool. This may allow the identification of potential problem applications, and may drive quality improvements.

In one embodiment, the index may be percentage-based, and may be weighted based on the executable lines of code ("ELoC"). By focusing on ELoC, for example, a large numbers of small applications may not skew the overall scan quality numbers.

In one embodiment, known problems (errors or warnings) may be assigned default weightings (e.g., 0.01 for known warning types, 0.3 for each known error type). The "known" may refer to whether the problems are defined in the "config" file. Problems not in the "config" file may be counted as "Other."

Alternate weightings may be made in the config file. Examples of such alternate weightings are provided in FIG. 4.

The actual weightings giving to each class of warning may be selected as necessary and/or desired.

In one embodiment, the effectiveness of the index may be measured. For example, an increase in scan quality of 10% may result in the discovery of 2 critical, 25 High, 8 Medium and 315 Low extra vulnerabilities.

Referring to FIG. 1, a system for software security scanning employing a scan quality index is disclosed according to one embodiment. System 100 may include server 110 including one or more computer processors that that may execute scanning engine 112 and scan quality index engine 114. In one embodiment, scanning engine 112 may be any suitable scanning engine, including commercial scanning engines (e.g., Fortify), open source scanning engines, etc.

In one embodiment, scan quality index engine 114 may receive the output of scanning index 112 directly. In another embodiment, scan quality index 114 may retrieve an output file from, for example, database 140.

System 100 may further include user interface 120. User 125 may interface with scanning engine 112 and/or scan quality index 114 using user interface 120. In one embodiment, user interface 120 may provide user 125 with results of the scan and/or the scan quality index.

Figure 2:
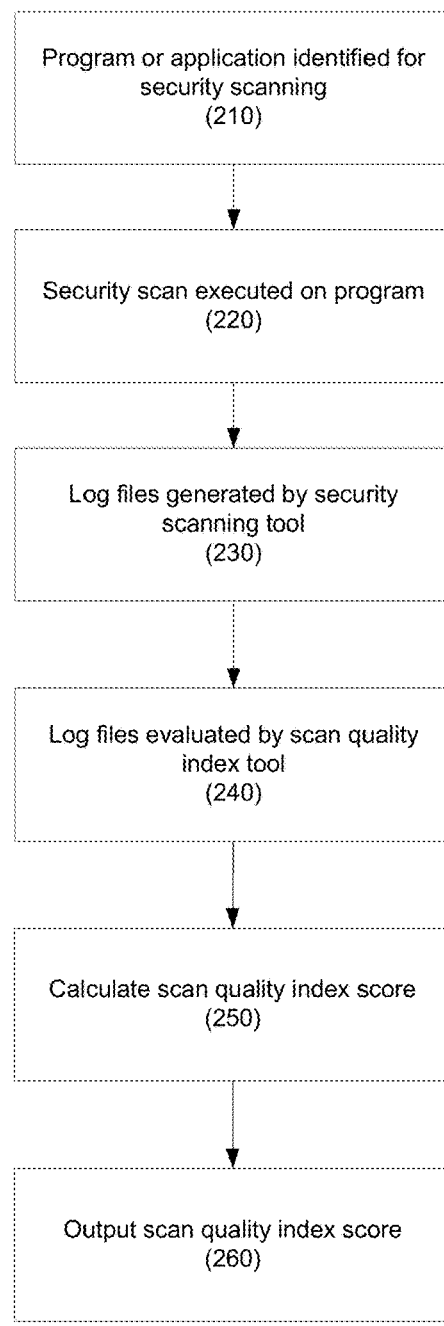
FIG. 2 depicts a method for software security scanning with employing a scan quality index according to one embodiment.

Referring to FIG. 2, a method for software security scanning employing a scan quality index is disclosed according to one embodiment.

In step 210, a program, application, etc. may be identified for security scanning. In one embodiment, some or all dependencies associated with the program may be provided.

In step 220, the security scan may be executed on the program. In one embodiment, the security scan may be executed by a vulnerability scanning engine, including commercially-available scanning engines, open source scanning engines, custom scanning engines, etc.

In step 230, one or more log file may be generated by the scanning engine as a result of the scan. In one embodiment, the log file(s) may be saved in a database, in local memory, etc.

Referring to FIGS. 3A and 3B, an example JSON structure for a config file is provided. These exemplary figures depict a full set of known error/warning definitions, and provide some scan quality weightings.

The keys of the two main maps are the strings that are searched for within the log blocks (e.g., each distinct entry in the logs—which may contain a heading, a list of items beneath it, stack trace, etc.). The value can either be a Boolean representing whether instances should be "suppressed" from the final counts (true=show, false=hide/suppress). If, however, the value is an object, there are various options. For example:

"heading": true/false—only counts the entries below the heading of this block (e.g. "unresolved references" lists each missing class on a new line beneath the heading.

"count_heading_only": true/false—counts only once for the entire block (likely the other lines of the block are things like stack trace.).

"alias": String—this is an alternate string to display for the count (like a friendly name)—if the search string is too long or confusing.

"suppress": true/false—if true this explicitly hides this warning/error from the counts.

"weighting": map—this allows per warning/error weightings.

"regex": String—regular expression pattern used to match the entire log line (rather than the 'contains' approach normally used) allowing for finer grain definitions.

Referring again to FIG. 2, in step 240, the log files may be evaluated by the scan quality index engine. In one embodiment, the different types of problem (e.g., error, severe, warning, etc.), the counts for each, etc. may be identified.

In one embodiment, the scan qualify index engine may access a configuration file that may identify known warnings. In one embodiment, the configuration file may identify weightings, etc.

In step 250, the scan quality may be calculated. In one embodiment, this may performed by a scan quality index engine.

In one embodiment, the scan quality may initially start out as 1.0 (i.e. 100%), and the presence of each warning may subtract a value, such as 0.01 (unless otherwise specified with "weighting"). The presence of each different type of ERROR subtracts a value, such as 0.3 (unless otherwise specified with "weighting"). The lowest score for the scan quality may be zero.

An example of weighting is provided in the known warning definition provided in FIG. 4. This weighting, with the alias "unresolved reference to java class", has been extracted from FIG. 3A.

In on embodiment, the ELoC/1000 (Executable Lines of Code) may be first calculated. In one embodiment, the key in the "weighting" may be a multiple of the (ELoC/1000) to use as a count threshold, over which the value in the map entry is used instead of the default warning/error weighting (0.01 and 0.3 respectively). For example, for an ELoC of 5,123 and an "Unresolved reference to java class" count of 3– ELoC/1000 is 5 (rounded), the count of 3 is less than that so 0.01 would be subtracted from the Scan Quality for the presence of this warning type.

As another example, for an ELoC of 4,567 and an "Unresolved reference to java class" count of 8, the ELoC/1000 is 5 (rounded). The threshold may then be 5×1=5, and the count of 8 is greater than that so 0.2 would be subtracted from the Scan Quality for the presence of this warning type.

As a third example, for an ELoC of 39,999 and an "Unresolved reference to java class" count of 500– ELoC/1000 is 40 (rounded). The threshold may then be 40×10=400, and the count of 500 is greater than that so 0.3 would be subtracted from the Scan Quality for the presence of this warning type.

In one embodiment, the scan quality index tool may provide a detailed explanation of the scan quality calculation to help users best target their remediation efforts. An exemplary output is provided in FIG. 6, which depicts a sample explanation of the scan quality index calculation.

Other methods of calculating a scan quality index may be used as necessary and/or desired.

Referring again to FIG. 2, in step 260, the scan quality index is output. In one embodiment, the counts and scan quality may be displayed per scan in a table format. An example output is provided in FIG. 5, which depicts a metrics table displaying the scan quality, warning/error counts, and executable lines of code.

In one embodiment, in addition to, or instead of, being presented in table format, the scan quality may be output graphically. An example graphical output is provided as FIG. 7, which depicts a scan quality display that plots contributing factors on a line graph to show trends.

In one embodiment, the calculated scan quality may be used for "tollgating" a release process (e.g., releases where the scan quality is below 0.5 (50%) are blocked). Other actions (e.g., sandboxing, sending notifications, etc.) may be taken as necessary and/or desired.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for software security scanning employing a scan quality index, comprising:
    a server comprising at least one computer processor receiving an identification of a computer program for security scanning;
    the server executing a security scan on the computer program and generating a log file comprising results of the security scan, wherein the log file comprises at least one of an error and a warning generated by the security scan;
    the server executing a scan quality index tool that generates a scan quality index score by analyzing the at least one error and a warning in the log file with a database comprising a configuration file identifying known error types and warning types, where the scan quality tool assigns a weighting to each error or warning based on whether each error or warning is a known error type or a known warning type, and wherein the scan quality index score represents a quality of the security scan; and
    the server outputting the scan quality index score.

2. The method of claim 1, further comprising:
    the server preventing release of the computer program when the scan quality index score is below a predetermined value.

3. The method of claim 1, wherein the identification of the computer program is received with the computer program is checked in to a production database.

4. The method of claim 1, wherein the identification further comprises an identification of one or more dependency associated with the computer program.

5. The method of claim 1, wherein the log file identifies at least a number of errors and a number of warnings generated by the security scan.

6. The method of claim 1, wherein the scan quality index score is weighted based on a number of executable lines of code in the computer program.

7. The method of claim 1, further comprising:
    saving the scan quality index score in a database.

8. A system for software security scanning employing a scan quality index, comprising:
    a server comprising at least one computer processor executing a security scanning engine and a scan quality index tool;
    a database comprising a configuration file identifying known error types and warning types;
    a production database comprising a computer program;
    wherein:
        the security scanning engine receives an identification of the computer program for security scanning;
        the security scanning engine executes a security scan on the computer program and generates a log file comprising results of the security scan, wherein the log file comprises at least one of an error and a warning generated by the security scan; and
        the scan quality index tool generates a scan quality index score by analyzing the at least one error and a warning in the log file with the configuration file, where the scan quality tool assigns a weighting to each error or warning based on whether each error or warning is a known error type or a known warning type, and wherein the scan quality index score represents a quality of the security scan.

9. The system of claim 8, wherein the scan quality index tool prevents release of the computer program when the scan quality index score is below a predetermined value.

10. The system of claim 8, further comprising:
    a user interface in communication with the server that receives the scan quality index score.

11. The system of claim 8, wherein the security scanning engine automatically scans the computer program when it is checked in to the production database.

12. The system of claim 8, wherein the log file identifies at least a number of errors and a number of warnings generated by the security scan.

13. The system of claim 8, wherein the scan quality index score is weighted based on a number of executable lines of code in the computer program.

* * * * *